Oct. 21, 1941.  M. PACCADOLMI  2,260,091
LIGHT SUPPORT
Filed June 1, 1940
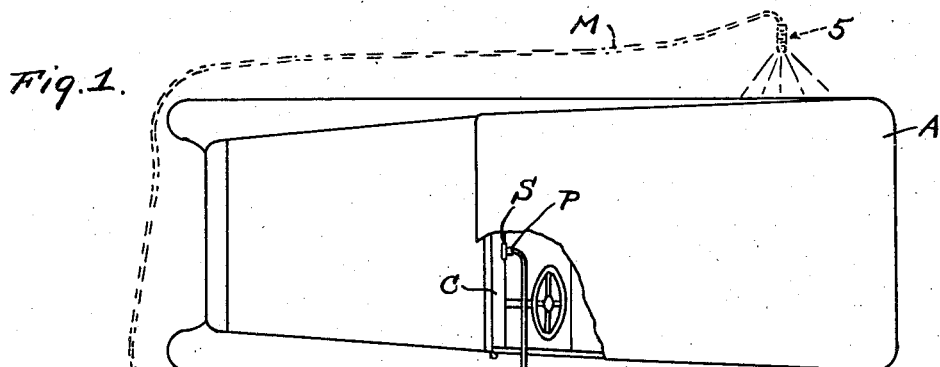
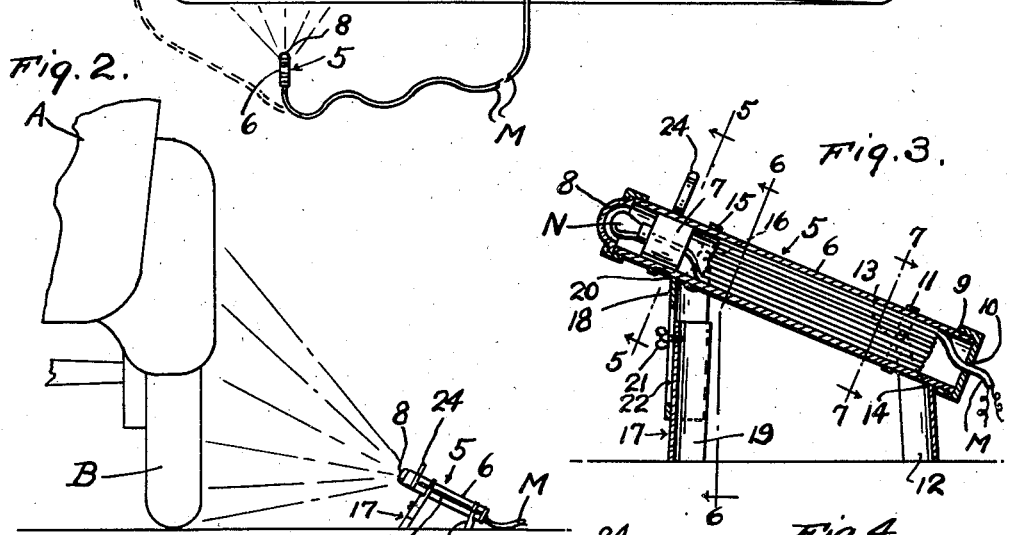
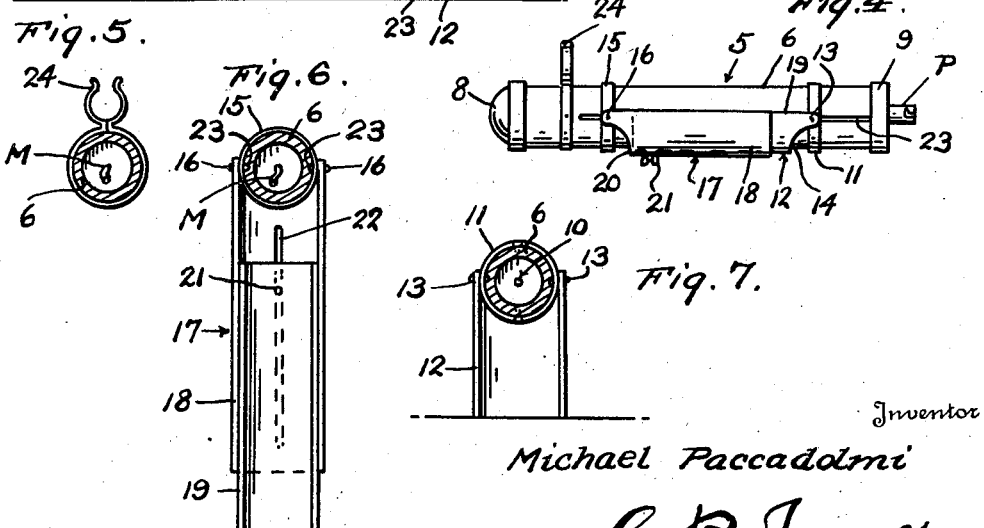
Inventor
Michael Paccadolmi
By L. B. James
Attorney Patented Oct. 21, 1941

2,260,091

UNITED STATES PATENT OFFICE 2,260,091

LIGHT SUPPORT

Michael Paccadolmi, Ridgefield, Conn.

Application June 1, 1940, Serial No. 338,437

1 Claim. (Cl. 240—8.18)

This invention relates to electric lights and more particularly trouble lights for automobiles.

The primary object of this invention resides in the provision of a trouble light adapted to be connected to the electric circuit of automobile lighting systems and extended in the region of the wheels thereof to readily facilitate removal and replacement thereof at night.

Another object of this invention resides in the provision of a trouble light adapted to be connected to the electric circuit of automobile lighting systems and supported from the ground in the region of automobile wheels.

A further object of this invention resides in the provision of a trouble light adapted to be adjustably supported in the region of automobile wheels so as to direct the light rays therefrom on the wheels.

A still further object of this invention resides in the provision of a trouble light adapted to house an extension electric cable when not in use.

Aside from the above mentioned objects this invention resides in the provision of a trouble light having supporting legs certain of which are adapted to be adjusted longitudinally of the trouble light housing.

In addition to the aforesaid objects this invention resides in the provision of a trouble light adapted to be removably connected to a part of the automobile beneath the hood thereof to permit working on the engine and adjuncts thereof at night.

Among the many objects of this invention is the provision of a trouble light having foldable supports.

With these and other objects in view this invention resides in certain novel features to be hereinafter set forth in the specification, illustrated in the accompanying drawing and pointed out in the appended claim and, while this disclosure depicts my present conception of the invention, the right is reserved to resort to such changes in construction and arrangement of elements as come within the scope of the claim.

In the accompanying drawing forming a part of this application:

Fig. 1 is a plan view of an automobile with a portion of the top thereof broken away showing the trouble light in full lines disposed in the region of the right front wheel thereof and in dotted lines in the region of the right rear wheel, the cable being shown connected to an electric terminal on the instrument board.

Fig. 2 is a rear view of the right rear wheel of an automobile showing the trouble light disposed in the region thereof.

Fig. 3 is an enlarged longitudinal vertical sectional view through the trouble light.

Fig. 4 is a similar view showing the trouble light with its supporting legs folded.

Fig. 5 is a detail cross sectional view approximately on line 5—5 of Fig. 3.

Figs. 6 and 7 are similar views approximately on the lines 6—6 and 7—7 of Fig. 3.

In the present illustration of this invention the letter A designates a conventional automobile mounted on wheels B and having an instrument board C on which is disposed a terminal socket S connected to the automobile electric system, (not shown), said socket S is adapted to removably receive an electric plug P of any desired type disposed on the inner end of an electric cable M to electrically connect a high amperage electric bulb on the opposite end thereof and forming an adjunct to a trouble light 5, constituting the subject matter of this application, with the electric systems of automobiles.

The trouble light consists of a hollow casing 6 removably supporting the aforesaid high amperage electric bulb therein by a dielectric block 7 and has a strong lens 8 removably secured at one end in front of the electric bulb and a removable cap 9 at its opposite end provided with an aperture 10 through which the cable M passes.

Secured to and adjacent the rear end of the casing 6 is an annular band 11 adapted to support a rear leg 12 as by pivot pins 13 or the like. Said leg is of U-shape in cross section to provide a wide area of contact with the ground and to permit folding thereof against the casing when not in use, the inner end thereof being cut out as at 14 to permit it to lean slightly to the rear when in operative position and prevent accidental folding thereof.

Slidably secured to the casing 6 forwardly of the leg 12 is an annular band 15 to which is pivotally supported as at 16, a substantially U-shape front leg 17 consisting of inner and outer sections 18 and 19, the inner section cut out as at 20 to permit it to lean slightly forward to coact with the rear leg in maintaining the rigidity of said supporting elements, said outer section 19 being slidably connected to the inner section 18 by a thumb-screw 21 or the like carried thereby and passing through a slot 22 in the inner section for tightening the sections together when adjusted.

In order to retain the front and rear legs in longitudinal alignment the heads of the pivot pins 16 are seated in slots 23 extending longitudinally in opposite sides of the casing, thus it will be appreciated that the band 15 with the leg 17 pivoted thereto cannot rotate on the casing 6, the same being slid on the casing from the rear end prior to assembling the rear leg and cap thereon.

The front leg, like the rear one is adapted to be folded against the casing when not in use.

To facilitate supporting the trouble light from a rod or the like beneath the hood of an automobile a spring clip 24 is secured to the casing 6.

With the elements of this invention assembled in operative position, that portion of the cable end extending beyond the open end of the casing and slidably carrying the cap 9 adjacent the plug P thereof is folded into loose elongated convolutions or otherwise loosely wound and inserted into the casing whereupon the cap 9 having the free end of the cable passing through the opening 10 thereof is screwed on the casing with the plug P disposed exteriorly of the cap so the cable can be easily and quickly drawn from the casing simply by pulling on the plug. Subsequent to withdrawing the cable the required length, the plug is connected to the electric circuit of the automobile and the light is set up adjacent the point of trouble.

With this invention fully set forth it is maintained that a trouble light of appreciable utility is provided and, through the simplicity of construction thereof, it can be cheaply manufactured and sold at a very reasonable cost.

Having thus described my invention what I claim and desire to protect by Letters Patent is:

A trouble light comprising a hollow casing having diametrically disposed slots in its periphery extending from one end of the casing adjacent its opposite end, annular bands surrounding the casing, pins carried by said bands and slidably engaged in the aforesaid slots, legs pivotally secured to the annular bands by said pins, an electric bulb removably secured within the casing at one end thereof, a lens removably secured to that end of the casing containing the electric bulb, a cap removably secured to that end of the casing opposite the end thereof having the lens and closing the open end of the aforesaid slots therein, and an electric cable connected to the bulb with its free end extending through an aperture in the cap.

MICHAEL PACCADOLMI.